United States Patent Office 3,018,307
Patented Jan. 23, 1962

3,018,307
PROCESS FOR PRODUCING
PURIFIED BORAZOLES
Donald S. Taylor, Whittier, Joseph G. Bower, Orange, and Robert E. Bohm, Fullerton, Calif., assignors to United States Borax & Chemical Corporation, Los Angeles, Calif., a corporation of Nevada
No Drawing. Filed Dec. 17, 1959, Ser. No. 860,108
2 Claims. (Cl. 260—551)

This invention relates as indicated to a process for producing purified borazoles and more particularly to a new and novel method for purifying crude B-trichloroborazole.

Crude B-trichloroborazole has been purified in the past using vacuum sublimation techniques. However, such prior art methods have proved to be difficult, slow, and expensive, principally because B-trichloroborazole has a low bulk density and thus has very poor heat transfer characteristics and also due to the fact that heat transfer through the walls of a vacuum chamber is very poor. In order to overcome the defect of poor heat transfer, excess heat had to be used to bring about sublimation and such excess heat caused substantial losses of B-trichloroborazole due to thermal decomposition. Additionally localized heating also caused any of the impurities in the crude B-trichloroborazole which are heat sensitive to volatilize and carry over into the sublimate collecting chamber and recontaminate the final product.

An economical method for producing pure B-trichloroborazole has long been desired because of certain unique properties which it possesses; for example, B-trichloroborazole can be used in the synthesis of high stability inorganic polymers. B-trichloroborazole is an especially effective dehydrating agent and also is an especially effective catalyst in Friedel-Craft type reactions. However, due to the effect of a large number of impurities many of the reactions that B-trichloroborazole could enter into are hindered.

It is therefore the principal object of this invention to provide a new and novel process for the purification of crude B-trichloroborazole.

It is a further object of this invention to set forth a process for the purification of B-trichloroborazole that is commercially feasible.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method of purifying crude B-trichloroborazole, which comprises dissolving impure B-trichloroborazole at a temperature of no more than about 85° C. in anhydrous mineral oil having a boiling point of at least about 300° C., separating the mineral oil solution of B-trichloroborazole from undissolved matter under anhydrous conditions and distilling B-trichloroborazole under anhydrous conditions from said solution at a temperature range of from about 80° C. to about 200° C. at below atmospheric pressure.

From the foregoing broadly stated paragraph it will be seen that the present process first comprises dissolving the crude B-trichloroborazole in mineral oil whereby solid impurities are readily removed by any of the well-known separation techniques, as for example, filtration, centrifuging, decantation, etc. Thus the method of separating the mineral oil solution from the solid impurities is immaterial as long as the process is conducted under anhydrous conditions. The next step of the process comprises separating the B-trichloroborazole from solution at below atmospheric pressure. This procedure allows the desired end product to be distilled at a temperature whereby the impurities and the mineral oil are left behind. Attention is directed to the fact that the mineral oil must be anhydrous and have a boiling point no less than about 300° C. It will be also noted that by having the B-trichloroborazole in solution the problem of heat transfer is overcome and it now becomes possible to distill the B-trichloroborazole at a temperature (about 80° to about 200° C.) whereby there is substantially no loss of product due to thermal decomposition.

In the preferred embodiment of our invention we use filtration as the method for separating the solid impurities from the solution for easy operation and low cost. As for the distillation step, whereby the B-trichloroborazole is separated from the mineral oil and any impurities which are in solution, it is to be clearly understood that the distillation can be carried out at any pressure below atmospheric pressure. In the preferred embodiment of our invention we use a pressure range of from about 10 mm. Hg. to about 40 mm. Hg. pressure.

The following illustration is indicative of the process for purifying B-trichloroborazole.

Example I 10 pounds of crude B-trichloroborazole were dissolved in 3.5 pounds of mineral oil in a 12-liter flask at about 80° C. The solution was then treated with about 20 grams of decolorizing carbon and filtered through a heated funnel under an anhydrous atmosphere into a 12-liter distilling flask. The 12-liter distilling flask was then connected to another 12-liter flask which was placed in a Dry Ice bath and was used as the distillate receiver. The pressure in the flasks was then reduced to about 200 mm. Hg. and the distillation was carried out with the temperature of the solution slowly being raised from about 80° to about 200° C. The distillation was stopped when the solution temperature reached about 200° C. and no more product was visibly being removed from the solution.

Using the foregoing process, yields of 85–90%, based on the amount of pure product recovered to the amount of crude product charged are obtained. About 70% of the impurities are removed by the separation of the solid impurities from the solution and about 30% of the impurities are removed in the distillation.

From the foregoing example it will be seen that the present process has the added advantage of readily lending itself to a continuous operation.

Other modes of applying the principle of the invention may be employed, change being made as regards the details described, provided the features stated in any of the following claims or the equivalent of such be employed.

We, therefore, particularly point out and distinctly claim as our invention:

1. The method of purifying crude B-trichloroborazole which comprises dissolving impure B-trichloroborazole at a temperature of no more than about 85° C., in anhydrous mineral oil having a boiling point of at least about 300° C., separating the mineral oil solution of B-trichloroborazole from undissolved matter under anhydrous conditions and distilling substantially pure B-trichloroborazole under anhydrous conditions from said solution at a temperature range of from about 80° to about 200° C. at below atmospheric pressure.

2. The method of claim 1 wherein the solution of B-trichloroborazole is separated from the undissolved matter by filtration and the B-trichloroborazole is distilled from said mineral oil solution at a pressure of from about 10 to about 40 mm. Hg.

References Cited in the file of this patent

Schaeffer et al.: Journal of the American Chemical Society, vol. 76, page 3306 (1954).